United States Patent [19] [11] Patent Number: 4,577,658
Bosteels et al. [45] Date of Patent: Mar. 25, 1986

[54] CALIBRATED FLUID FLOW CONTROL DEVICE

[76] Inventors: Michel Bosteels, 157 Avenue Haras, B 1150 Bruxelles, Belgium; Ambro Oliva, 180 Boulevard de Montmorency, 95170 Deuil la Barre, France

[21] Appl. No.: 626,322

[22] Filed: Jun. 29, 1984

[30] Foreign Application Priority Data

Jun. 30, 1983 [FR] France ................... 83 10922

[51] Int. Cl.$^4$ .................. F16K 31/08; H01H 47/00
[52] U.S. Cl. ............................ 137/599; 251/65; 251/129.10; 335/234; 361/210
[58] Field of Search .............. 137/599; 251/65, 137; 340/644; 335/234; 361/208, 210

[56] References Cited

U.S. PATENT DOCUMENTS

| 1,847,339 | 3/1932 | Freeman | 361/208 X |
|---|---|---|---|
| 2,229,903 | 1/1941 | Schmohl et al. | 277/57 |
| 2,842,753 | 7/1958 | Ewen | 340/644 X |
| 3,200,591 | 8/1965 | Ray | 361/210 X |
| 3,502,105 | 3/1970 | Ernyei et al. | 137/599 |
| 3,634,735 | 1/1972 | Komatsu | 361/210 X |
| 3,661,178 | 5/1972 | Wichman | 137/595 |
| 3,726,296 | 4/1973 | Friedland et al. | 137/1 |
| 3,827,457 | 8/1974 | Vutz et al. | 137/599 |
| 4,019,533 | 4/1977 | Jerde et al. | 137/599 |
| 4,205,307 | 5/1980 | Liermann et al. | 340/644 |
| 4,248,263 | 2/1981 | Langill, Jr. et al. | 137/454.2 |
| 4,392,632 | 7/1983 | Gast et al. | 251/65 |
| 4,450,863 | 5/1984 | Brown | 137/613 |

FOREIGN PATENT DOCUMENTS 0029225 5/1981 European Pat. Off. .
1385031 2/1975 United Kingdom .

Primary Examiner—Martin P. Schwadron
Assistant Examiner—Stephen M. Hepperle

[57] ABSTRACT

Calibrated fluid flow control device comprising several valves (1a to 1b) mounted in parallel on a single body (2) receiving in several housings (6), several seats and several interchangeable calibrated nozzles, the housings (6) being connected to a common input (8) and a common output (7). The valves are preferably bistable electrovalves.

2 Claims, 3 Drawing Figures

CALIBRATED FLUID FLOW CONTROL DEVICE

The present invention relates to a device controlling the calibrated flow of at least one fluid and comprising several valves of the type with on-off elements in parallel which, when opened, each determines a given flow. The device also comprises a system controlling the said valves separately or according to any combination of valves.

Aside from flow regulating mechanisms, namely servomotor valves, which have many a disadvantage (complicated, considerable space taken up, high cost price, slow working, high electricity consumption), suggestions have previously been made, in respect of flow control mechanisms, to use several valves in parallel, each of which determines a given flow when opened. By controlling the foregoing valves separately or according to a given set of combinations, it is possible to obtain different and well-defined types of flow; for instance, according to a binary progression such as 1-2-4-8-16 or any other.

However, these well-known devices use several separate valves. This implies not only the use of a great number of components and accessories, but also the installation of multiple canalizations for connecting fluids and of electrical connections controlling the valves. As a result, not only are the cost price, space occupied and the system's complication considerable, but there is also a risk of fluid leakage and, consequently, the system is less reliable.

The object of the present invention is a fluid flow control device using several valves of the type with on-off elements in parallel and which distinguishes itself from other known devices in that it occupies less space, has a simpler structure, is more reliable and costs less.

This invention relates to an electrically controlled device regulating the calibrated flow of fluid and using less electricity, thus resulting in little dissipation of heat.

In addition, the invention relates to a device controlling the calibrated flow of fluid and which may be controlled by transient pulses, in particular without being converted by output data fed by a computer, a data processor, a mini-or micro-processor etc.

Finally, the invention also relates to a device controlling the calibrated flow of fluid and which not only ensures that the different valves remain in their respective position, programmed or otherwise, in case of a power cut and until they receive new instructions, but also allows for the control of the actual position of the different valves.

The device controlling the calibrated flow of fluid comprises, for several valves, a single body with several identical or similar housings containing several seats corresponding to several check valves and several interchangeable calibrated nozzles each of which determines a given flow. This single body also has at least one fluid-inlet port and at least one fluid-outlet port leading, respectively, upstream from the above-mentioned seats and downstream from the foregoing nozzles in the above housings.

The coupling of all or part of the valves in a single body makes it possible to considerably reduce space-needed and cost price, compared with the use of a corresponding number of separate valves, and to eliminate most problems concerning coupling or water-tightness. The housings made in the single body are all identical or analagous and can receive, freely, any of the interchangeable calibrated nozzles according to the flow desired.

Preferably, the valves in the invention are bistable electrovalves. This allows the different valves to remain in a position, programmed or acquired, even in the case of a power cut and until they receive new instructions. Electrical energy is only used when valves are repositioned.

According to a preferred embodiment of the invention, bistable electrovalves comprise a permanent magnetic system determining the two preferred positions of the bistable check valves as well as an electromagnetic system designed to reposition the said check valves.

Preferably, the permanent magnetic system is composed of two fixed and permanent magnets and, for each valve, a moving magnetic core, integral with the check valve. The electromagnetic system comprises, for each valve, two coils, which may be fed in both directions and which are arranged in such a way that whenever they are fed in one direction, the magnetic field of one reinforces the action of the field of one of the permanent magnets on the core, while that of the other reduces or cancels the action of the magnetic field of the other permanent magnet on the core and inversely.

This allows for a rapid control calling for little energy.

Mounting several valves on a single body makes it possible to also use permanent magnets common to several valves.

Preferably, both coils of each valve are fed in both directions by a continuous polarity power suply unit, passing through a pulse controlled circuit.

In order to allow for positioning of the different valves, the device as set out in the invention is completed by a valve position detection device. This detection device comprises, in the case of the coils mounted in series, a frequency generator feeding the coils of each valve at their extremities. In addition, this device comprises a synchronous detector with a reference input linked with one of the outputs of the frequency generator and a detection input connected at the junction of both coils mounted in series with a view to detecting impedance variations of coils according to the position of the moving core. Thus, the detection device, which works like a differential transformer, is extremely simple in that it used valve control means (coils, moving core).

We shall now describe in further detail, with reference to the accompanying drawing, an illustrative and non restrictive embodiment of a device controlling the flow of fluids as set out in the invention. In the drawing.

Figure 1:
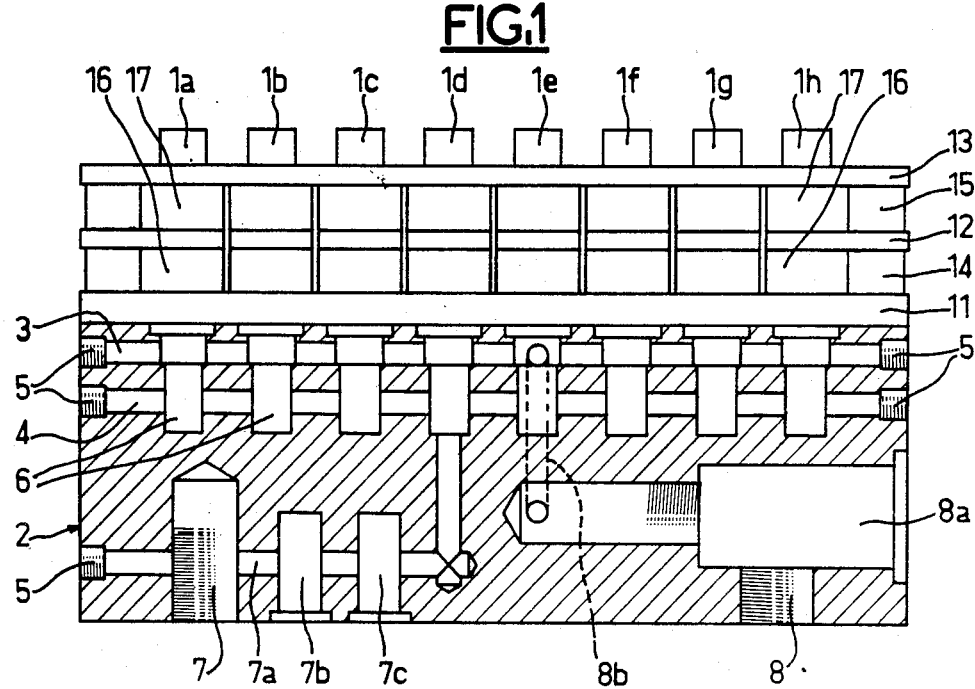
FIG. 1 is a partially side elevation and a partially sectioned view of a device as set but in the invention using eight electrovalves.

As shown in FIG. 1, the flow control device comprises eight electrovalves ranging from 1a to 1h and mounted on a single body 2. The body is a parallelipiped with two longitudinal and superimposed through holes 3 and 4, sealed at both ends by a plug 5. Eight identical blind holes 6 are made in the upper part of the casing 2, at regular intervals from one another and with holes 6 cutting across holes 3 and 4. A tapped blind hole 7 making it possible to connect a pipe-line not represented in the diagram is fitted out in the bottom of casing 2 and communicates, by means of a pipe 7a sealed at one end by a plug 5 with the lower longitudinal hole 4. Pipe 7a passes, between hole 7 and hole 4, through two other holes 7b and 7c which are disposed at a distance from each other in casing 2. Holes 7b and 7c are used to receive two electrodes from a flow measuring device of the type determining transit time such as described by the European patent application No. 80 401 098.1 published under No. 23 457. A tapped blind hole 8 also making it possible to connect a pipe-line not represented here is made in the lower section of casing 2, leads to a longitudinal blind hole 8a used to receive a filter not represented here and communicates through pipe 8b with the upper longitudinal hole 3. Hole 8 serves as a fluid inlet and hole 7 as a fluid outlet.

All eight blind holes 6 are purpose-built to each receive the fluid control section of an electrovalve 1a to 1h, which will be described in detail with reference to FIG. 2. FIG. 1 also shows, above casing 2, two plates 11 and 13 acting as pole pieces and covering the full length of casing 2, as well as an intermediary plate divided into as many sections of pole pieces as there are valves in the device. It also illustrates two permanent magnets 14 and 15 covering the full length of casing 2, one located between pole pieces 11 and 12 and the other between pole pieces 12 and 13, and shows two coils 16 and 17, connected with each electrovalve 1a to 1h and positioned between pole pieces 13 and 12 on the one hand, and pole pieces 12 and 13 on the other.

Thus, permanent magnets 14 and 15 are common to all electrovalves 1a to 1h.

Figure 2:
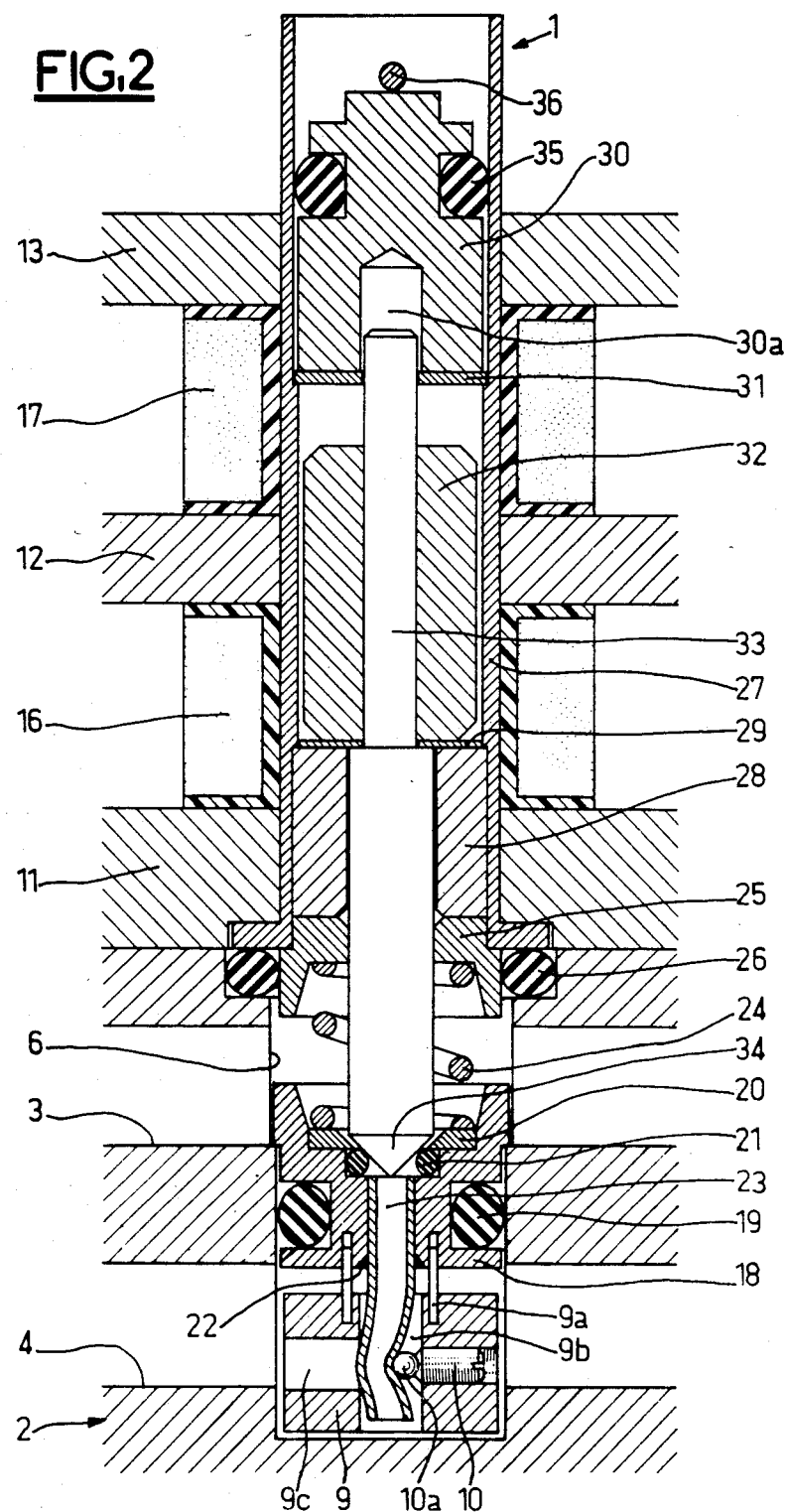
FIG. 2 shows a larger scale section of an electrovalve in the device illustrated in FIG. 1.

As shown in FIG. 2, each electrovalve 1 is composed of a coaxial unit with elements that are rotationally symmetrical, i.e., symmetrical to the common axis.

A separating piece 18 is placed in blind hole 6, between the holes 3 and 4, an O-ring joint 19 ensuring watertightness between holes 3 and 4 on the outside rim of piece 18. The latter comprises a staged axial port which is composed from top to bottom, of a large diameter section designed to receive a washer 20. This section is coupled, by means of a shoulder, to a section of smaller diameter designed to receive an O-ring joint 21. The latter is in turn joined, by means of a shoulder, to a section of smaller diameter in which, through welded joint 22, a tube 23 made out of flexible metal is fitted and goes downnwards past piece 18.

Below piece 18, hole 6 contains a clamping ring 9 which goes around, with some amount of play, piece 18 by means of several pins 9a disposed around axial hole 9b of ring 9. Tube 23, coupled with piece 18, extends through hole 9b as far as under hole 9c which is fitted diametrically into ring 9. A part of hole 9c, extending as far as the intersection with hole 9b, is tapped and receives a clamping screw 10. Between the inside end of clamping screw 10, and tube 23, one finds a ball 10a. By means of clamping screw 10, ball 10a put pressure against tube 23 which rests against side of hole 9c opposite, according to two diametrically opposed arcs. Pins 9a give ring 9 an axial mobility with respect to piece 18 so as to avoid stress on tube 23 during adjustments and caused by thermal expansion. It should be noted that the diameter of hole 9c is superior to that of tube 23.

A spring 24 is supported by washer 20 and its upper end rests against a guide bearing 25 whose watertightness, with respect to casing 2 and above hole 3, is ensured by an O-ring joint 26.

Bearing 25 is held in a position such that it compresses spring 24 by means of a sleeve 27 made out of a non-magnetic material. Sleeve 27 houses a lower magnetic pole face 28 the top of which bears against a shoulder of sleeve 27, and an upper magnetic pole face 30 the bottom of which bears against a shoulder of sleeve 27 by means of a washer 31. It also contains a core 32 integral with a rod 33 taking the shape of a truncated conical valve 34 at its lower end. A non-magnetic washer 23 is intercalated between core 32 and a shoulder of rod 33. Rod 33, guided into bearing 25 and washer 31 which also acts asa bearing, moves along, with some play, a through hole in pole face 28 and a blind hole 30a in pole face 30. The latter is mounted so as to be watertight, thanks to a joint 35, and is axially immobilized by a pin 36 in sleeve 27.

It is shown in FIG. 2 that after having disposed, in order, ring 9 with guide pins 9a, piece 18 with tube 23, its seals 19 and 21 and its washer 20, spring 24 and bearing 25 with its seal 26 in hole 6 of casing 2, and after having added sleeve 27 with pieces 28 to 36, one needs only attach, on casing 2 and by any appropriate means, pole pieces 11, 12 and 13 with intermediary coils 16 and 17 and with intercalated permanent magnets 14 and 15 as seen in FIG. 1. Piece 18 is held by spring 24 so as to rest against a shoulder of hole 6, between holes 3 and 4.

Washer 20 serves as a thrust washer designed to reduce compression, thanks to the conical valve 34, of seal 21 acting as a seat for the valve 34 which is movable along a path determined by the difference in distance separating pole faces 28 and 30 and the height of core 32.

It should be noted that, when opened, the port provided for between seat 21 and the valve 34 is at least equal in dimension to the inside section of tube 23 which is not subjected to compression. In the case of a small number of valves with a somewhat similar flow tubes 23 may all be identical and their compression may be regulated by screws 10, thus making it possible to obtain the different pre-determined flows which may be graded, for example, according to a binary progression 1-2-4, etc. . , inter alia. In a large number of valves and/or presenting a considerable difference between minimal flow to be established and the flow in the valve giving maximal flow, it is preferable to use at least two groups of tubes of different diameters.

Permanent magnets 14 and 15 are disposed in such a way as to have their North poles facing centre pole pieces 12 while their South poles face towards pole plates 11 and 13 respectively or inversely. The flux of both magnets is therefore transported by pole piece 12 towards the centre of core 32, where it crosses the air gap formed by the non-magnetic sleeve 27. The magnetic flux of opposite polarity of each magnet also passes through plates 11 and 13, also crossing the air gap formed by sleeve 27 at pole faces 28 and 30.

The two permanent magnets' magnetic fields seek to close themselves off by exerting forces of attraction on core 32. The latter therefore has two preferred positions, one with respect to one of the permanent magnets (pole pieces 11 and 12) and the other with respect to the other permanent magnet (pole pieces 13 and 12), one of the fields closing itself off while the other opens up, according to the position of core 32.

Coils 16 and 17 which are used to transfer core 32 from one preferred position to another may be connected either in series or in parallel, but in such a way that when coils 16 and 17 both carry the current in one direction, the field created by one coil reduces or cancels the action exerted by the magnetic field of one of the permanent magnets on core 32, while the field of the other coil reinforces the action of the field of the other permanent magnet on coil 32. When the current is reversed in the coils, the reverse coils reduce and reinforce the action exerted by the field of the respective permanent magnet.

As soon as core 32 achieves a preferred position under the effect of the current passing in one direction through the coils, it is held in this position by the field of the corresponding permanent magnet so long as both coils do not conduct current in opposite direction.

Current can be controlled in coils 16 and 17 by an ordinary electric switch.

Figure 3:
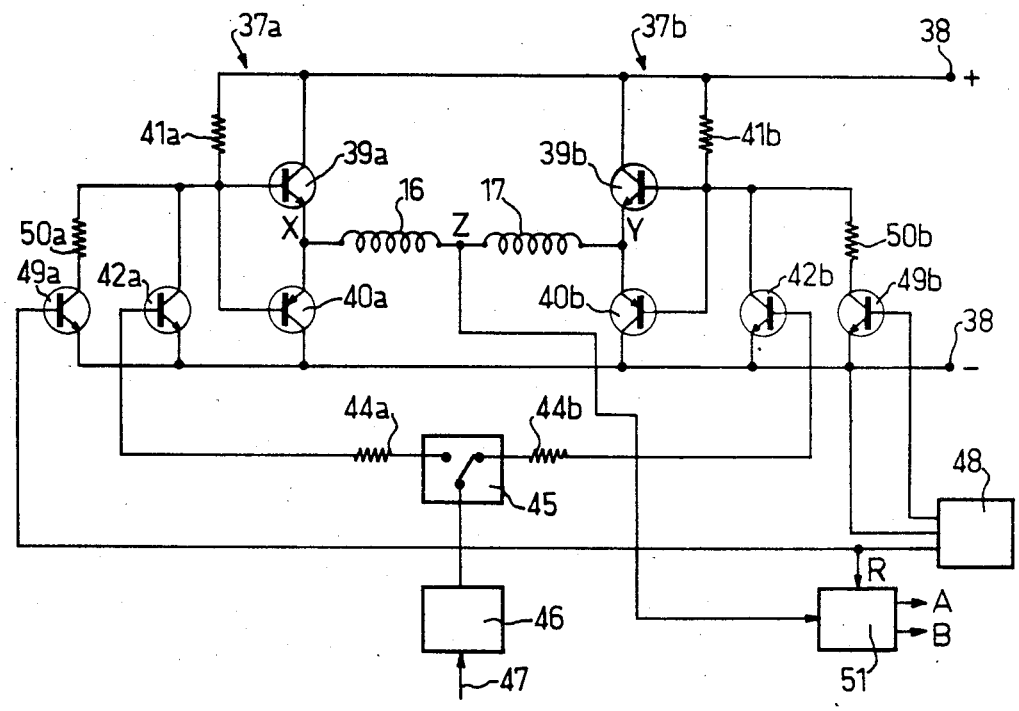
FIG. 3 represents the schematic drawing of a control and position detection circuit of electrovalves in the device shown in FIG. 1.

FIG. 3 represents the schematic drawing of an electronic control using electric pulses in coils 16 and 17 with a constant polarity power supply.

This control circuit in H comprises two branches 37a and 37b mounted in parallel on a constant polarity power supply 38. Each branch 37a, 37b, comprises two reverse transistors 39a, 40a or 39b, 40b (NPN,PNP) mounted in series between the two terminals (+) and (−) of power supply 38. The outside terminals of the series connection of coils 16 and 17 are connected at junctions X and Y of the emitters' transistors 39a, 40a and 39b, 40b respectively. The base of transistors 39a, 40b and 39b, 40b of each branch are interlinked and coupled by a resistor 41a, 41b at terminal (+) of power supply 38. The collectors of transistors 39a, 40a and 39b, 40b are directly connected to terminals (+) and (−) of power supply 38.

In addition, each branch 37a, 37b comprises a transistor 42a or 42b of the type NPN whose emitter is directly connected to terminal (−) of power supply 38, and whose collector is directly connected to the bases of transistors 39a, 40a or 39b, 40b. The bases of transistors 42a, 42b are connected, respectively, by a resistor 44a, 44b at the two output terminals of a switch 45 whose input terminal is connected to a pulse generator 46, capable of transmitting a pulse in response to an actuation at its input 47.

As described above, the circuit is completed by a device designed to detect valve position. This detection device comprises a frequency generator 48 transmitting, at its two outputs, two alternating signals in opposite phase. Each output of generator 48 is connected to the base of a transistor 49a or 49b of the type NPN. Thus, transistors 49a, 49b of the emitter are connected to the terminal (−) of power supply 36, and the collector is coupled by a resistance 50a, 50b to the bases of transistors 39a, 40a and 39b, 40b. The position detection device also comprises a synchronous detector 51 with a reference input connected to one of the outputs of generator 48 and a detection input, respectively at the junction Z of both coils 16 and 17.

Hereinafter will be described the operation of the control circuit and of the valve position detection device as shown in FIG. 3.

When power supply 38 is in service, and in the absence of instructions at output 47 of pulse generator 46, both transistors 42a and 42b are non-conductive. Transistors 39a and 39b are conductive due to the current passing through resistors 41a and 41b and feeding the bases of these transistors and both trannsistors 40a and 41b are non-conductive. Voltage drop being feeble at the terminals of both resistors 41a and 41b, both points X and Y which are the external terminals of both coils 16 and 17 mounted in series practically have the same potential as terminal (+) of power supply 38. Consequently, current does not pass through coils 16 and 17.

Commutator 45 being in the position shown in FIG. 3 in order to connect the pulse generator 46 to branch 37b, when a pulse is sent by generator 46 in response to an actuation at its input 47, through the current-limiting resistor 44b at the base of transistor 42b, the latter becomes conductive and, consequently, a current passes through resistor 41b and transistor 42b. Transistor 39b then becomes non-conductive and transistor 40b conductive due to increased voltage drop in the terminals of resistor 41b. As a result, point Y practically acquires the potential of terminal (−) of power supply 38 and a current passes through transistor 39a, both coils 16 and 17 and transistor 40b. Thus, the moving core of the corresponding electrovalve is put in one of its preferred positions. When the actuation at input 47 is done away with, the core is held in this position by the corresponding permanent magnet and the control circuit reverts to its initial state: namely, current no longer passes through coils 16 and 17.

To bring the moving core of the electrovalve into the other preferred position, switch 45 is reversed and a pulse is sent from generator 46 through the resistor 44a and on the base of transistor 42a which thereby becomes conductive. Transistor 39a then becomes non-conductive and transistor 40a conductive due to increased voltage drop at the terminals of resistor 41a. As a result, point X practically acquires the potential of terminal (−) of power supply 38 and a current passes through transistor 39b, coils 17 and 16 and transistor 40a. Under the effect of the current passing through coils 17 and 16, the moving core is put into the other preferred position, following which, after doing away with actuation by generation 43, the circuit reverts to its initial state.

The electrovalve position detection device uses impedance variations in coils 16 and 17 according to the relative position of the moving core with respect to coils. For example, on FIG. 2 one recognizes that in the position shown, moving core 32 exerts greater action on coil 16 than on coil 17, so that coil 16 has a higher inductance than coil 17. The contrary is also true in the other preferred position of moving core 32.

As the frequency generator 48 sends two sets of alternating signal in opposite phase, one to the base of transistor 49a and the other to the base of transistor 49b, these transistors become conductive one after the other. Thus, current is transmitted, alternatively, from the terminal (+) of power supply 38, through resistor 41a, resistor 50a and transistor 49a, and through resistor 41b, resistor 50b and transistor 49b. Owing to the presence of resistor 50A, 50b, the potential at the junction of resistors 41a, 50a on the one hand, and 41b, 50b on the other, is modulated at a lower level than the supply voltage and remains invariable at points X and Y respectively, transistors 39a, 39b acting as "copiers". According to the relative impedance values of coils 16 and 17, the potential at junction Z varies with respect to points X and Y. The synchronous detector 51 picks up the displacement of potential at point Z towards existing value in X or Y and, thus, picks out the acquired phase in Z according to the impedance imbalance of coils 16 and 17. In this way, the detector 51 actuates, through its output A or B, a display control unit or in the case of automatic control, a position control device.

Control of the device as set out in the invention is compatible, without need for conversion, with output data fed by a computer, data processor, a mini- and micro-processor etc. Therefore, the device is the most direct and the most rapid conversion element between the physical quantity to be set and electronic control, as distinct from known regulatory systems needing several mechanical, electrical and electronic transformations to translate control instructions.

Valve position detection and information feedback concerning actual position of valves, perfectly meet organization needs of interactive data processing systems.

By providing for a flow meter or, more precisely, the two detection electrodes of a flow meter, on the device itself, data concerning actual flow may also be fed back to the control unit.

It is self-evident that the hereinabove described embodiment illustrated in the accompanying drawing was furnished purely with a descriptive and non-restrictive intent, and that numerous modifications and variants are possible within the framework of the invention. Thus, the structure of the different electrovalves and, in particular, the embodiment of the calibrated nozzles which are also adjustable, may differ from that represented. These nozzles may be, for instance, pieces 18 which, instead of tubes 23, bear directly calibrated ports made by any appropriate method (drilling, spark erosion, ultrasound, laser, etc.).

The permanent magnetic system determining the two preferred positions of the electrovalves' core may comprise a single permanent magnet acting, through one pole, on both pole pieces 11 and 13 and, through the other pole, on pole piece 12.

If the two coils 16 and 17 are mounted in parallel, the control circuit and the position circuit should evidently be modified accordingly. Furthermore, these circuits may be built with other known electronic components.

In the illustrative embodiment presented, calibrated valves play a direct role; in other words, calibrated nozzles are disposed directly downstream the check valve controlled. However, as set out in the invention, the device can also play an indirect role or act as control valves. In this case, they serve to control another series of check valves by using either the fluids' own energy or an auxiliary fluid such as compressed air or a liquid, calibrated ports being disposed, in this case, downstream the check valves controlled. Likewise, all elements are fixed to a single body.

One should also note that the device, as set out in the invention, may be used for example for carrying out controlled mixtures of several fluids or for proportioning a liquid. In both cases, groups of valves mounted in parallel are linked with several inputs and/or outputs.

Of course, the device as set out in the invention can only ensure a precise flow if fluid pressure is regulated upstream.

By way of an example, a device as embodied in the invention comprising seven electrovalves controlling the flow through seven calibrated ports according to a binary progression, the smallest port determining a flow 1, makes it possible to obtain, by adding, 127 different flows gauged from 1 to 127. In many cases, it is advantageous to provide for a supplementary electrovalve on the same device and which allows for a non-calibrated flow, far more extensive than that obtained by adding flows from all calibrated electrovalves, with a view to the rapid filling of pipes, reservoirs, etc.

Flow control of cryogenic fluids is a particularly advantageous application of the invention. Indeed, given that valves dissipate little energy and only during repositioning, the entire device, as embodied in the invention, may be set so that it is directly at the temperature of the cryogenic fluid. As opposed to the use of conventional valves, no moving mechanical cross-piece is needed in the body housing the device.

We claim:

1. A device for calibrated flow control of at least one fluid, comprising a plurality of bistable electrovalves of the on-off type mounted on a single body having therein a plurality of recesses containing a plurality of seats for a plurality of valves and a plurality of calibrated nozzles, each of which determines a given flow, and at least one fluid inlet pipe and one fluid outlet pipe leading, respectively, upstream of said seats and downstream of said nozzles in said recesses, the improvement wherein the bistable electrovalves comprise permanent magnetic means for maintaining each said valve in each of its two positions and, for each valve, electromagnetic means for moving each said valve from each of its positions to its other position, the permanent magnetic means comprising two fixed permanent magnets and, for each valve, a moving magnetic core integral with the valve, the electromagnetic means comprising, for each valve, two coils which may be fed in both directions and are disposed in such a way that when the two coils are fed in one direction, the field of one coil reinforces the action exerted by the field of one magnet on the core, while the field of the other coil reduces or cancels the action exerted by the field of the other magnet on the core, and inversely, the two coils of each valve being fed in one direction and in the other by a continuous polarity power supply passing through a pulse-controlled circuit, the two coils being mounted in series, valve position detecting means for each valve comprising a frequency generator feeding the two coils at their extremities and a synchronous detector with a reference input connected to one of the outputs of the frequency generator, and a detection input connected to the junction of the coils for determining the position of the moving core on the base of impedance variations affecting the coils according to the position of the moving core.

2. A device for calibrated flow control of at least one fluid, comprising a plurality of bistable electrovalves of the on-off type mounted on a single body having therein a plurality of recesses containing a plurality of seats for a plurality of valves and a plurality of calibrated nozzles, each of which determines a given flow, and at least one fluid inlet pipe and one fluid outlet pipe leading, respectively, upstream of said seats and downstream of said nozzles in said recesses, the improvement wherein the bistable electrovalves comprise permanent magnetic means for maintaining each said valve in each of its two positions and, for each valve, electromagnetic means for moving each said valve from each of its positions to its other position, the permanent magnetic means comprising permanent magnets common to several valves and, for each valve, a moving magnetic core, the electromagnetic means comprising, for each valve, two coils disposed in such a way that when the two coils are fed in one direction, the field of one coil reinforces the action exerted by the field of one magnet on the core, while the field of the other coil reduces or cancels the action exerted by the field of the other magnet on the core, and inversely, the two coils of each valve being fed in each direction by a continuous polarity power supply passing through a pulse-controlled circuit, the two coils being mounted in series, valve position detecting means for each valve comprising a frequency generator feeding the two coils at their extremities and a synchronous detector with a reference input connected to one of the outputs of the frequency generator, and a detection input connected to the junction of the coils for determining the position of the moving core on the base of impedance variations affecting the coils according to the position of the moving core.

* * * * *